(12) United States Patent
Worden et al.

(10) Patent No.: US 12,449,161 B2
(45) Date of Patent: Oct. 21, 2025

(54) SELF-SHIELDING PHOTOVOLTAIC MODULE TRACKER APPARATUS

(71) Applicant: Gamechange Solar Corp., New York, NY (US)

(72) Inventors: Andrew Barron Worden, New York, NY (US); Scott Van Pelt, Tarrytown, NY (US)

(73) Assignee: Gamechange Solar Corp., Norwalk, CT (US)

( * ) Notice: Subject to any disclaimer, the term of this patent is extended or adjusted under 35 U.S.C. 154(b) by 1260 days.

(21) Appl. No.: 17/017,247

(22) Filed: Sep. 10, 2020

(65) Prior Publication Data

US 2021/0071914 A1 Mar. 11, 2021

Related U.S. Application Data

(60) Provisional application No. 62/898,186, filed on Sep. 10, 2019.

(51) Int. Cl.

| | |
|---|---|
| *F24S 25/00* | (2018.01) |
| *F24S 25/12* | (2018.01) |
| *F24S 25/634* | (2018.01) |
| *F24S 25/70* | (2018.01) |
| *H02S 20/32* | (2014.01) |
| *H02S 20/10* | (2014.01) |

(52) U.S. Cl.
CPC .............. *F24S 25/70* (2018.05); *F24S 25/12* (2018.05); *F24S 25/634* (2018.05); *H02S 20/32* (2014.12); *H02S 20/10* (2014.12)

(58) Field of Classification Search
None
See application file for complete search history.

(56) References Cited

U.S. PATENT DOCUMENTS

| 9,203,343 B2* | 12/2015 | Holze | H02S 40/00 |
|---|---|---|---|
| 2003/0172922 A1* | 9/2003 | Haber | H02S 20/32 |
| | | | 126/607 |
| 2010/0043776 A1* | 2/2010 | Gee | F24S 50/00 |
| | | | 126/571 |
| 2011/0226232 A1* | 9/2011 | Grip | F24S 30/452 |
| | | | 126/604 |
| 2014/0216531 A1* | 8/2014 | Werner | H02S 20/00 |
| | | | 136/251 |
| 2016/0020725 A1* | 1/2016 | Miyahara | F24S 30/422 |
| | | | 136/246 |

(Continued)

*Primary Examiner* — Steven M Marsh

(57) ABSTRACT

A solar panel assembly comprises a plurality of solar panel arrays, each substantially parallel, where the plurality of solar panel arrays comprises a windward array located at an upwind perimeter of the solar panel assembly, where each of the plurality of solar panel arrays comprises a plurality of racking structures. The rotatable shaft of the windward array comprises a thickness and a length that provides a torsional stiffness, which allows the rotatable shaft of the windward array to deflect 60-80 degrees from a horizontal plane, that is perpendicular to length of the stationary structural member, in response to an applied torque from wind speeds on the windward array in excess of 70 mph, thus positioning the solar panels mounted to the windward array to shield the plurality of solar panel arrays located downwind from the windward array from high wind loads.

7 Claims, 9 Drawing Sheets

(56) References Cited

U.S. PATENT DOCUMENTS

| | | | | |
|---|---|---|---|---|
| 2016/0065123 | A1* | 3/2016 | Hayes | F24S 40/20 |
| | | | | 136/246 |
| 2016/0238189 | A1* | 8/2016 | Angel | F24S 25/70 |
| 2019/0253021 | A1* | 8/2019 | Needham | G01M 9/04 |
| 2021/0311507 | A1* | 10/2021 | Needham | G01P 13/02 |
| 2021/0359639 | A1* | 11/2021 | Compaan | F24S 50/20 |
| 2022/0123689 | A1* | 4/2022 | Creasy | H02S 20/30 |
| 2022/0129018 | A1* | 4/2022 | Needham | H02S 20/32 |

* cited by examiner

*Top plot is wind speeds (in full scale mph) with concurrent angular displacement of each tracker.*

*Lower plots are deflections of each tracker, in degrees. Nominal initial tilt is -30° (leading edge nose-down into the wind), wind direction is 90° (normal to the tracker axis), nominal torsional damping is 20%.*

$U_{cr}$ for 30° motion for all rows at damping = 20%. Right axis shows the 30-second gust critical wind speed at 15 ft and the left axis shows the equivalent 3-second gust at 10 m. Data points in the grey band indicate that the top wind tunnel speed was reached.

SELF-SHIELDING PHOTOVOLTAIC MODULE TRACKER APPARATUS

This application claims priority to U.S. patent application Ser. No. 62/898,186 filed Sep. 10, 2019, which is hereby incorporated by reference in its entirety.

BACKGROUND OF THE INVENTION

1. Technical Field

This disclosure relates generally to a photovoltaic module installation and, more particularly, to apparatuses for use in a photovoltaic module optimization.

2. Background Information

The solar industry is a highly competitive market and utility-scale projects tend to prioritize lower equipment pricing. This competitive pressure has led to a trend in single axis tracker companies foregoing developing an understanding of the lifetime cost of the tracker system because of a desire to save on engineering analyses. This compromise in analyses has led to an increased incident rate during extreme weather conditions. As the industry matures, there is an increased expectation of longer-term equipment life. Companies that perform advanced dynamic wind analyses for their photovoltaic module tracker systems will gain a competitive advantage in the industry as they will have the data to predict operations and maintenance costs.

Current wind tunnel testing enables an understanding of the loading across photovoltaic modules within a tracker row and the sheltering effect of trackers adjacent to it. The results of this testing are critical as designers must pay attention to tracker rows with east-west and north-south exposures within a power plant. The most useful data is the dynamic effects of wind on photovoltaic trackers. Torsional divergence (galloping) is a result of vortices generated along (and later thrown off from) the leading edge and trailing edge of a single axis photovoltaic module tracker row. This phenomenon occurs strongest at shallow tilt angles between the solar modules and the horizontal. The first vortex pulls the tracker upward, away from the flat position. This winds the row tube like a torsional spring. At some point the resisting torsion in the tube overcomes the wind load and the sudden release of the vortex on the top of the modules leads to a rapid loss of torque. The tracker then springs back past flat, and a vortex forms on the underside of the leading edge. This pulls the leading edge downward, until the second vortex is released, at which point the tracker twists back up above flat, and the process continues. If the wind speed is high enough (i.e., there is enough input energy into the system) the system becomes unstable, with the amplitude increasing each time, until the final rotations reach a maximum value, often at rotations of +/−90° or more and even through its entire tracking range. This triggers large torsional loads and potentially tracker structural failure.

The vortex shedding is a similar phenomenon, however, it occurs at higher tilts or tracker angles when the wind vortices hit downwind tracker rows at their resonant frequency. For conventional trackers, if the wind speed passes a critical wind speed, the tracker table will begin to rock back and forth about the plane of the tilt of the single axis tracker. Amplitudes of motion will increase until the tracker is structurally damaged. However, vortex shedding requires wind gusts of a longer duration and, unlike torsional galloping, can be mitigated with proper dampening and frequency analysis.

The data shows the most efficient way to negate tracker instability is through stow angles and proper damping. When using stow angles of 0 degrees, the tracker will shed vortices at both sides of a photovoltaic module, leading to instability. When using high stow angles, vortices shed only on one side of the photovoltaic module, which enables the tracker to better stay under control, even at high wind speeds. Tracker geometry and stiffness effect the precise angle and dampening required. It is understood that a technique way to negate torsional instability is to stow at high angles. Although this approach increases static loading on a tracker, it makes the system stable during high wind gusts.

Traditionally single axis trackers are designed to withstand wind speeds of about 90-120 mph, and it is assumed that the tracker remains stable up to that point. However, it has since been shown that instability occurs well below the design wind speed if not properly accounted for in the design. Tracker dynamics comprise a number of characteristics. The chord length of the photovoltaic module being one of the characteristics. When the photovoltaic module is stowed parallel to the ground, chord length refers to the east-west length of a single tracker row. Conservatively assuming consistent design coefficients, the torque in the system increases with the square of the chord length, while increasing linearly with the length of the row. Resonant frequency being another characteristic, which is based on several elements of tracker design, including weight, length and stiffness. One tracker row will have several dynamic mode shapes and resonant frequency for each. These resonant frequencies can be used to form a basic understanding of the magnitude of wind speeds that will cause dynamic amplification. Another characteristic is dampening. When the tracker sustains dynamic effects under wind loads, dampers reduce oscillations of a tracker. Studies have shown that dampening can sufficiently limit the effects of the vortex, although dampening will not prevent a tracker from becoming unstable when stowed at an angle close to 0 degrees. A system that is properly dampened significantly reduces the likelihood of failures in the field when paired with proper stow strategy. Another characteristic is wind stow parameters and performance, using control software that selects the correct stow angle, is important as is a system that can move rapidly to a safe position. Further characteristics include large chord length and low-stiffness tracking solutions, which are becoming more and more common due to their advantages of greater power density and fewer foundations than comparative designs. However, these advantages must be weighed against the increased risk of dynamic failure in certain modes. Specifically, the modes related to torsional modes of vibration. Modes that involve bouncing and heavy motions of the tracker are particularly susceptible to vortex shedding from upwind rows.

Conventional designs call for single axis trackers to be as structural stiff as possible. During normal operation rotational deflection is seen as a detriment, in that it prevents the supported solar modules from being normal to the irradiance of the sun. This concept is also applied in the design when considering the design wind load. Characteristics include stiff drive trains, dampers, rotational blockers, and other mechanisms to prevent rotation of the trackers to high tilt angles (relative to horizontal). However, this same stiffness creates a suboptimal tilt angle during high wind event in excess of 75 mph.

There is a need for an improved solar panel assembly.

SUMMARY OF THE DISCLOSURE

According to an aspect of the present disclosure, a type of single axis solar tracker is provided. The single axis solar tracker is installed in large groups called arrays. The structural design of the single axis tracker is partially governed by the wind load depending on the installation location. The single axis tracker allows the trackers on the east and west edges of the solar array, also known as a first tracker on the windward side, to deflect under high wind loads, thereby effectively creating a "wall" to shield the trackers on the interior of the array from high wind loads and the dynamic effects of wind loads.

The single axis tracker supports a number of photovoltaic modules (the payload) and rotates them from east to west to follow the path of the sun, thus causing the energy output of each solar module to increase.

The photovoltaic modules (e.g., tables), are mounted on small structural beams (purlins) which in turn are mounted to and supported by a tube (e.g., a rotatable shaft), for example a row tube, which rotates and therefore rotates the photovoltaic modules. The row tube is supported by a drive system, for example at the middle of the table. As the drive system moves, the row tube rotates and the photovoltaic modules rotate to follow the sun. When there is a significant wind event, the wind imparts pressure to the solar modules. Due to a number of aerodynamic phenomena the pressure the wind imparts to different parts of the photovoltaic module (leeward vs. windward, shielded vs. exposed) will vary. This pressure gradient results in a torque being applied from the modules to the row tube. As the wind speed increases, the torque increases roughly proportional to the square of the wind speed.

In one embodiment, the row tube has the ability to deflect up to a tilt of approximately 70 degrees from horizontal under wind speeds in excess of 75 mph, while restraining the row tube from over rotating and coming into contact with other parts of the tracker, such as the posts supporting the row tube. However, the row tube has sufficient torsional stiffness to still keep the solar modules within 5 degrees normal to the sun during normal operation with low and moderate wind speeds of up to roughly 30 mph.

According to an aspect of the present disclosure, a solar panel assembly comprises a plurality of solar panel arrays, each substantially parallel, where the plurality of solar panel arrays comprises a windward array located at an upwind perimeter of the solar panel assembly. Each of the plurality of solar panel arrays comprises a plurality of racking structures that comprise a stationary structural member securely anchored to a ground surface, a rotatable shaft secured to the stationary structural member via a bearing wheel and to which at least first and second solar panels are mounted via a clamp assembly, and a drive arm coupled at a proximate end to the rotatable shaft and coupled at a distal end to an actuator. The rotatable shaft of the windward array comprises a wall thickness and a length that provides a torsional stiffness, which allows the rotatable shaft of the windward array to deflect 60-80 degrees from a horizontal plane that is perpendicular to length of the stationary structural member, in response to an applied torque from wind speeds in excess of 70 mph, thus positioning the solar panels mounted to the windward array to shield the plurality of solar panel arrays located downwind from the windward array from high wind loads.

The rotatable shaft may comprise a length of square steel tubing about 4 inches×4 inches having a minimum yield strength of about 50-80 ksi.

The wall thickness of the steel tubing of the windward array may be about 0.1 inches.

The length of the rotatable shaft of the windward array may be about 150-400 feet, and comprise a plurality of shaft segments each coupled to an adjacent one of the plurality of shaft segments via a clamping sleeve.

According to another aspect of the present disclosure, a solar panel assembly, comprises a plurality of solar panel arrays, each substantially parallel, where the plurality of solar panel arrays comprises a windward array located at an upwind perimeter of the solar panel assembly. Each of the plurality of solar panel arrays comprises a plurality of racking structures comprising a stationary structural member secured to a surface, a rotatable shaft secured to the stationary structural member via a bearing and to which at least first and second solar panels are mounted via a clamp, and a drive arm coupled at a proximate end to the rotatable shaft and coupled at a distal end to a drive actuator that causes the rotatable shaft to rotate. The rotatable shaft of the windward array comprises a thickness and a length that provides a torsional stiffness, which allows the rotatable shaft of the windward array to deflect 60-80 degrees from a horizontal plane, that is perpendicular to length of the stationary structural member, in response to an applied torque from wind speeds on the windward array in excess of 70 mph, thus positioning the solar panels mounted to the windward array to shield the plurality of solar panel arrays located downwind from the windward array from high wind loads.

The foregoing features and the operation of the present disclosure will become more apparent in light of the following description and the accompanying drawing.

DETAILED DESCRIPTION

Figure 1:
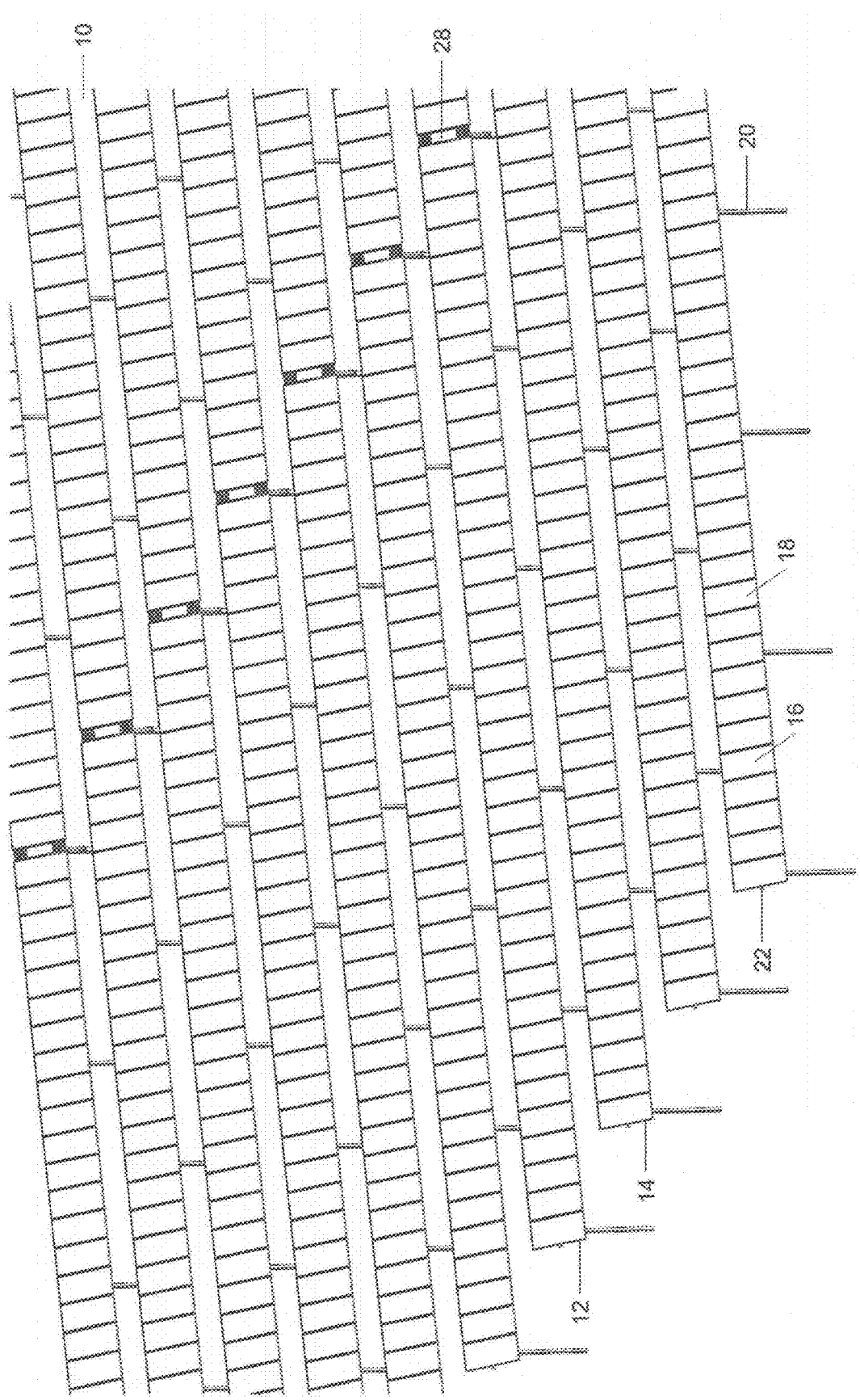
FIG. 1 illustrates a photovoltaic module installation.

FIG. 1 illustrates a photovoltaic module assembly 10. An exemplary embodiment of such a photovoltaic module assembly is the Genius Tracker® system designed by GameChange Solar Corp. of New York, N.Y. Of course, the solar panel installation of the present disclosure is not limited to the specific exemplary embodiment. For examples, one or more of the Genius Tracker® system components may be swapped out for components with alternate configurations, one or more the Genius Tracker® system components may be omitted and/or the Genius Tracker® system may be modified to include one or more additional components not specifically described herein. Examples of apparatus and assemblies for a solar panel installation are disclosed in U.S. Pat. No. 10,605,489, which is hereby incorporated by reference, and assigned to the assignee of the present application.

Referring again to FIG. 1, the solar panel assembly 10 includes one or more photovoltaic module tables 12, 14 (i.e., solar panel rows). Each of these photovoltaic module tables 12, 14 includes one or more solar panels 16, 18 (e.g., a linear array of solar panels) mounted to a racking structure 20. Each racking structure 20 includes a plurality of stationary structural members, a rotatable shaft 22, a plurality of bearing assemblies 24 (see FIG. 4), and at least one drive mechanism 26 (see FIG. 3).

Figure 2:
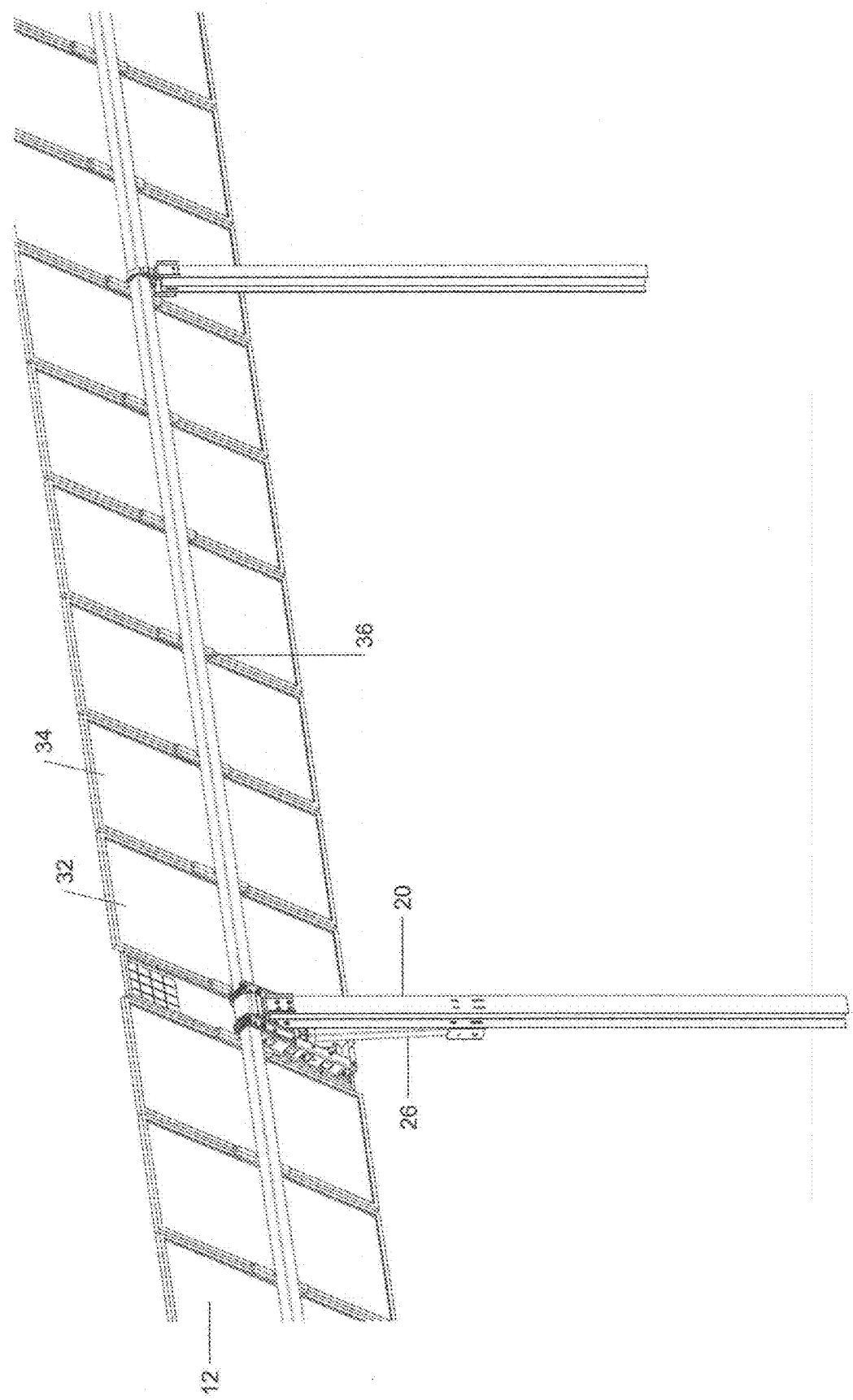
FIG. 2 illustrates a single axis tracker photovoltaic module.

FIG. 2 illustrates a photovoltaic module table 12, comprising the racking structure 20, a row tube 36 and a drive mechanism 26 to rotate one or more photovoltaic modules 32, 34 from east to west to follow the path of the sun. The rotation increases the energy output of each photovoltaic module 32, 34. The photovoltaic modules 32, 34 are mounted on one or more structural beams (e.g., purlins), and the structural beams are mounted to and supported by a structure with a length that extends axially (substantially horizontally) when installed along a rotational axis, for example, of the support tube or row tube 36. The row tube 36 is rotatable, and when rotated causes the photovoltaic modules 32, 34 to rotate.

Figure 3:
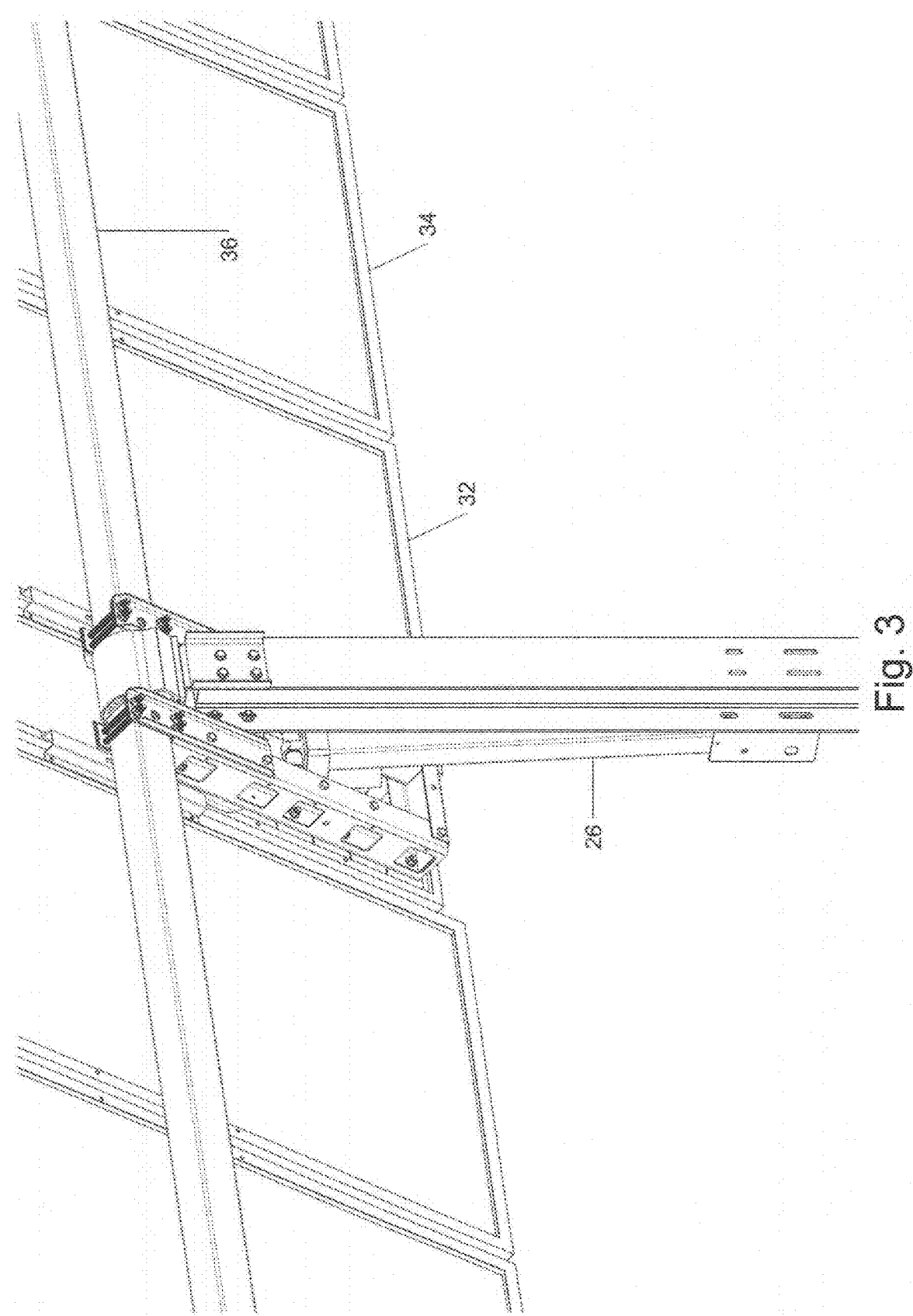
FIG. 3 illustrates a first embodiment of a single axis tracker photovoltaic module rotatable from east to west.

Referring to FIG. 3, the row tube 36 is supported by the drive shaft system 26, located towards the center of the photovoltaic module 32, 34 table.

Figure 4:
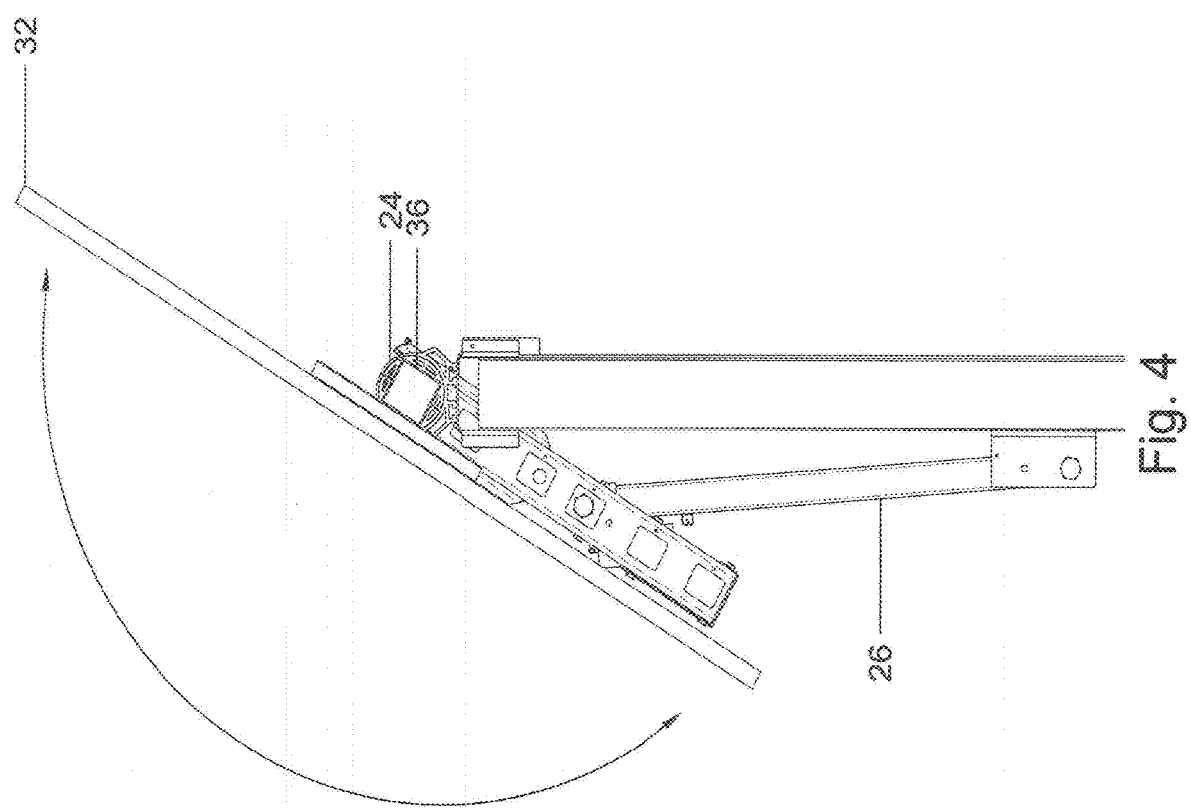
FIG. 4 illustrate a second embodiment of a row tube supported by a drive system towards the center of the table exemplary embodiment of a rotatable shaft.

Referring to FIGS. 2 and 4, movement of the drive shaft system 26, causes the row tube 36 to rotate and subsequently the photovoltaic modules 32, 34. The rotational movement of the photovoltaic module 32, 34 is to rotate in line with the movement of the sun from east to west.

Figure 5:
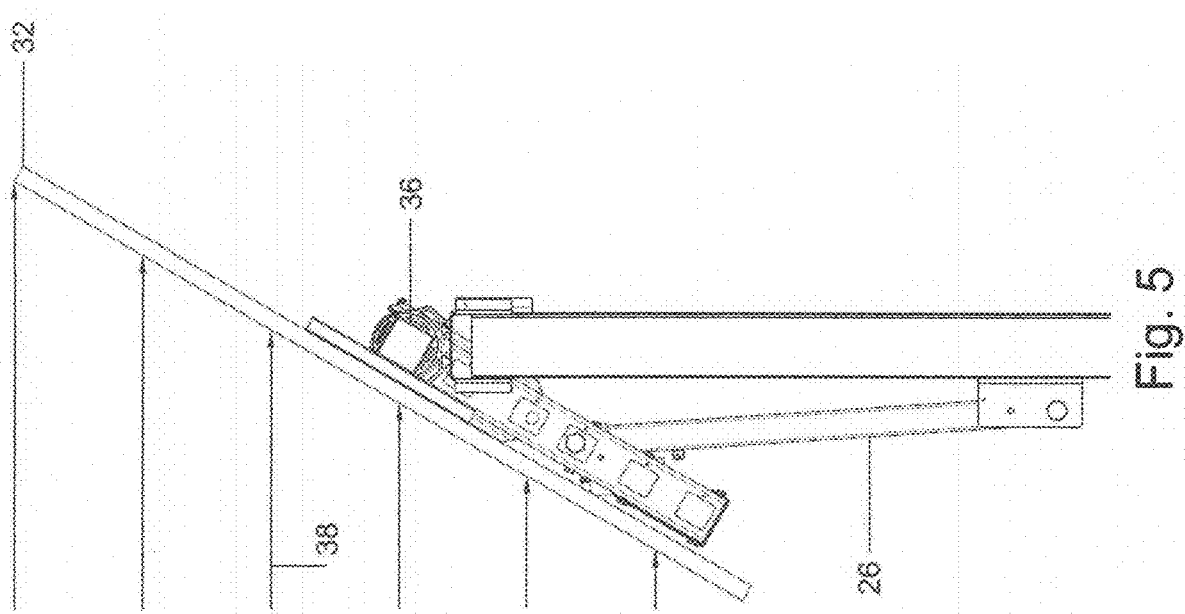
FIG. 5 illustrates varying wind pressure imparting onto the photovoltaic module in a significant wind event, adjacent segments coupled together with a coupler.

Referring to FIG. 5, a significant wind event will impart pressure 38 to the photovoltaic module 32. The pressure 38 the wind imparts to different parts of the solar module (e.g., leeward versus windward, shielded versus exposed) will vary. The pressure gradient results in a torque being applied from the modules to the row tube 36. As the wind speed increases, the torque increases, the torque increases roughly proportionately to the square of the wind speed. The row tube 36 is able to deflect to a significant amount (e.g., 60 to 80 degrees) from the horizontal when exposed to high wind speeds. The row tube may also be restrained from over rotating and making contact with other parts of the tracker system, for example, the posts supporting the row tube. In one embodiment, the photovoltaic modules 32 are supported by the row tube 36, which is supported by the drive train 26 that is attached toward the center of the photovoltaic module 32 table. This design results in long sections of the row tube extending to the north and south of the drive train 26. These long sections are aerodynamically referred to as wind spans, are subject to becoming structurally unstable due to torsional divergence and vortex lock in.

Figure 6:
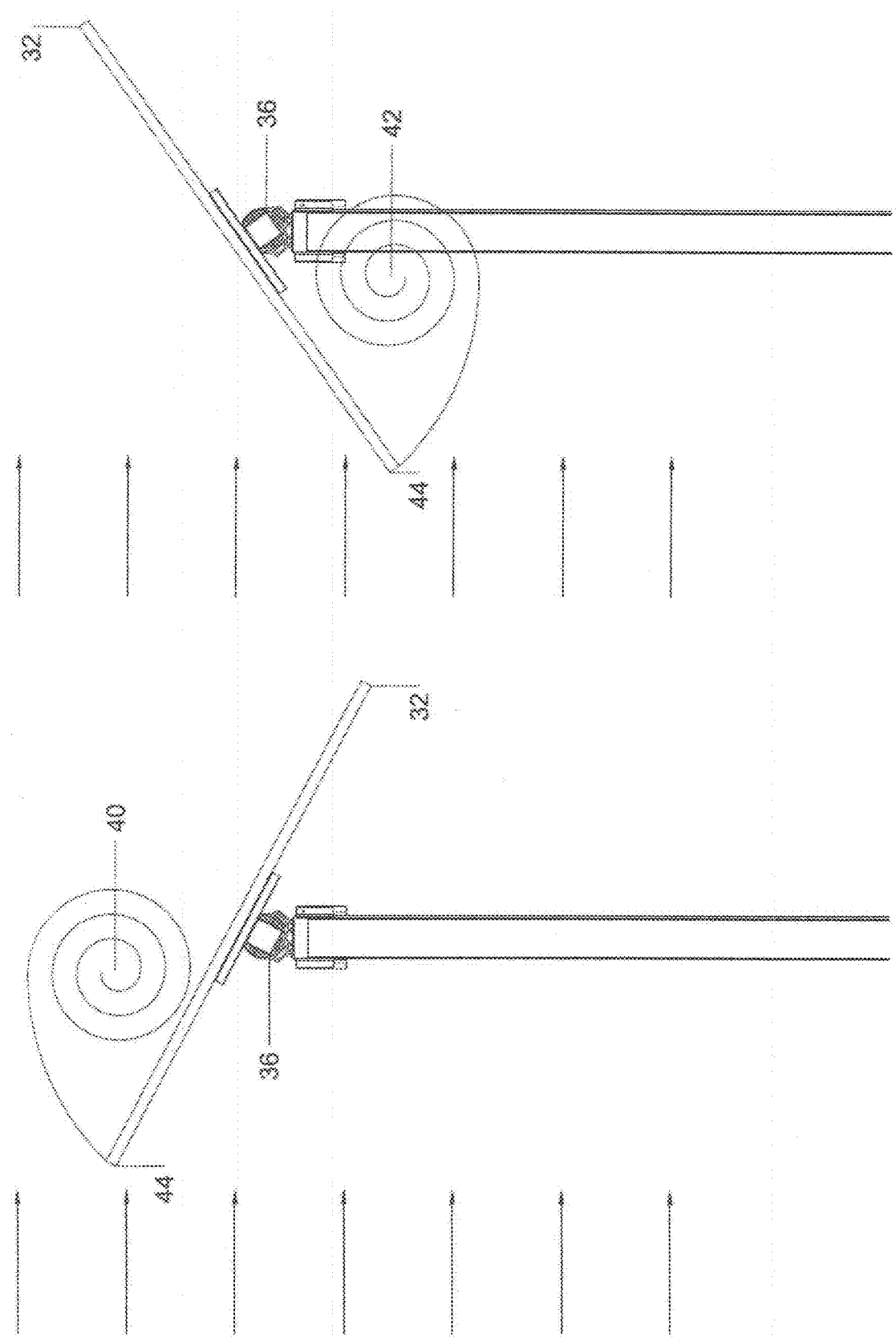
FIG. 6 illustrates the vortices of torsional divergence on a single axis tracker photovoltaic module.

Referring to FIG. 6, torsional divergence results from vortices 40, 42 generated along, and subsequently dispelled from, the leading edge of a photovoltaic module 32. Torsional divergence occurs at a stronger level when the photovoltaic module 32 table is positioned at a shallow tilt angle between the solar modules and the horizontal plane. The first vortex 40 pulls the tracker upward, away from the flat position. This movement winds the row tube 36 like a torsional spring. At an inflexion point the resisting torsion in the row tube 36 overcomes the wind load and the sudden release of the vortex 40, located on the upper side of the photovoltaic modules 32, leads to a rapid loss of torque. The photovoltaic module 32 and the corresponding tracker system springs back past the flat position and the vortex 42 forms on the underside of the leading edge 44 of the photovoltaic module 32. The vortex 42 pulls the leading edge downward, until the second vortex 42 is released, at which point the photovoltaic module 32 and tracker system twists back up above flat position, and the process continues. If the wind speed is high enough (e.g., there is enough input energy into the photovoltaic module 32 tracker system), the photovoltaic module 32 tracker system becomes unstable, with the amplitude increasing each time, until the final rotations reach maximum value. Maximum value often occurs at twists of +/−30 degrees or more, or the photovoltaic module 32 tracker system structurally fails. The vortex shedding is a similar phenomenon however, the vortex shedding occurs at higher tilts. For conventional photovoltaic module tracker systems, if the wind speed passes a critical speed, the photovoltaic module tracker table may begin to rock back and forth about the plane of the tilt of the single axis photovoltaic module tracker. Amplitudes of motion may increase until the photovoltaic module tracker is structurally damaged.

Figure 7:
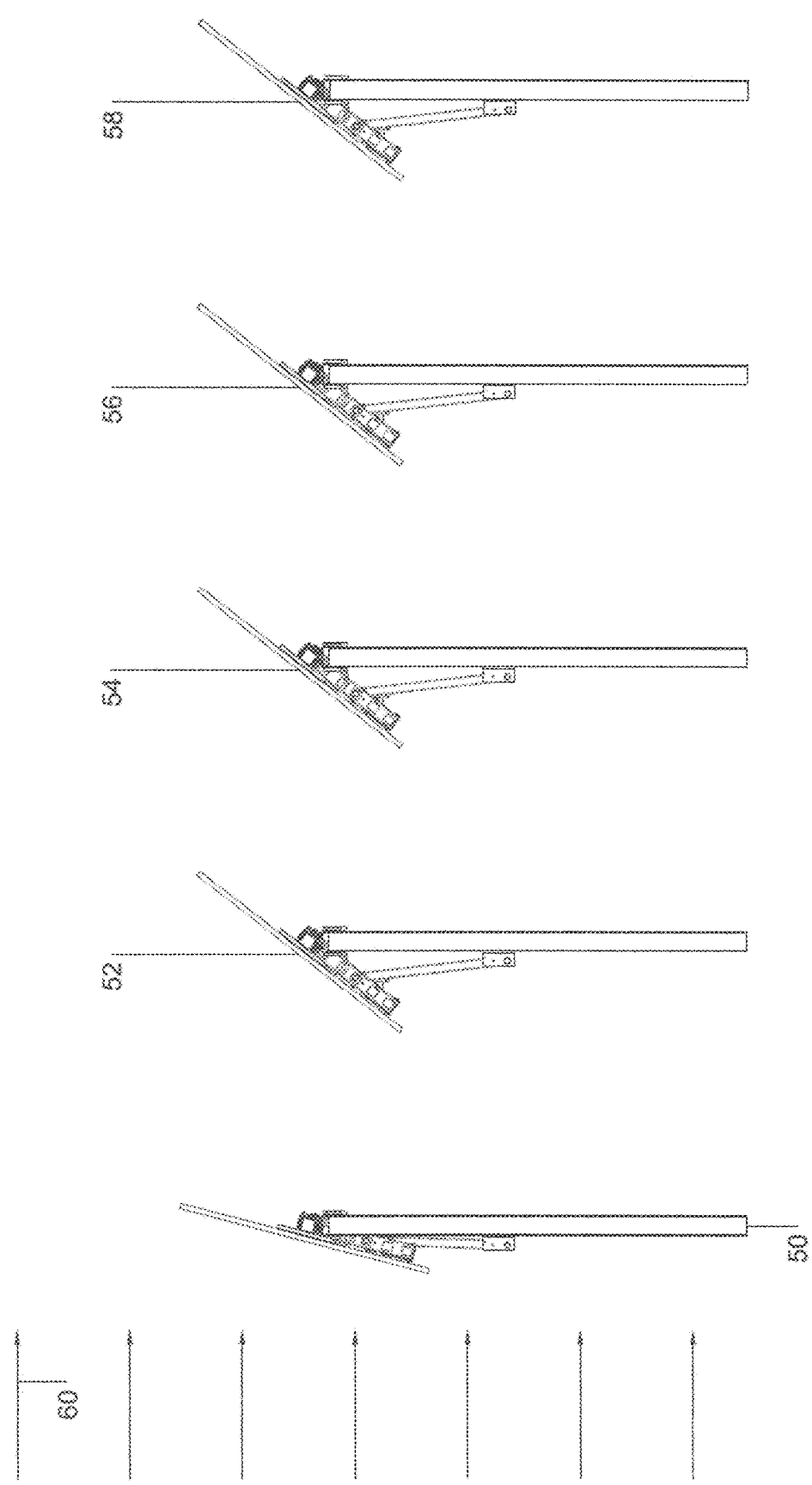
FIG. 7 illustrates a third embodiment of the east most and/or west most, or first tracker on the windward side, rows of the single axis tracker photovoltaic module deflecting and shielding the interior rows from the wind.

Referring to FIG. 7, when the first tracker on the windward side of windward photovoltaic module tracker row 50 deflects, and as a result the first tracker row 50 on the windward side shields interior rows 52, 54, 56, 58 from wind 60. The tables on the first tracker on the windward side of the photovoltaic module tracker row 50 cause the adjacent tables (e.g., 52, 54, 56, 58 and 60) to be in their wake, thus shielding these adjacent tables and reducing/preventing the adjacent tables from going unstable.

Figure 8:
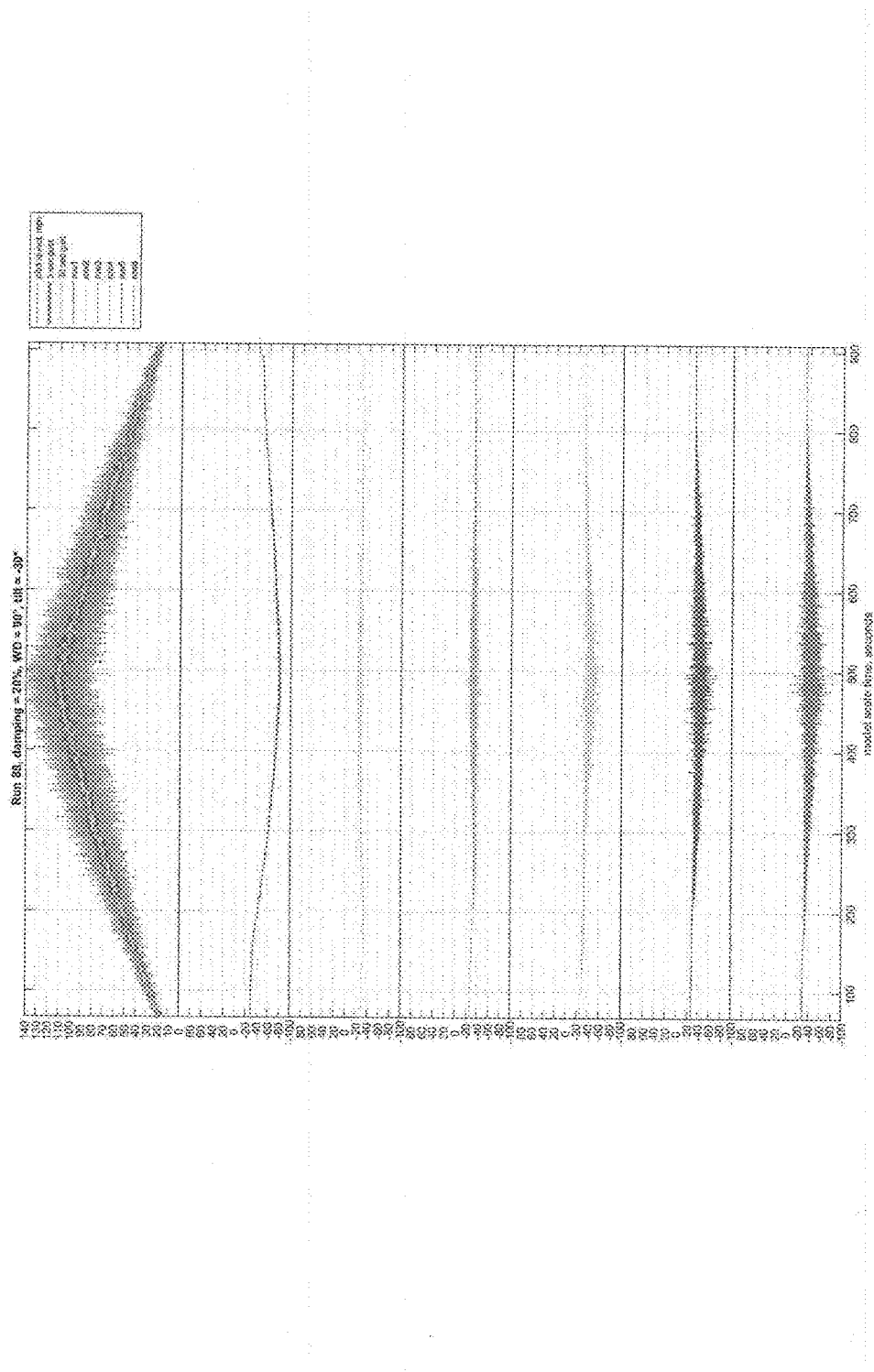
FIG. 8 illustrates the results from an aeroelastic study showing concurrent angular displacement of each tracker.

FIG. 8 illustrates the results of boundary layer wind tunnel testing on the six-tracker table. As the wind speed increases over the duration of the first half of the test, the rotation of the first tracker on the windward side of the array deflects to up to 80 degrees. As a result, the tables downwind from the first tracker row 50 (e.g., tables in rows 52, 54, 56, . . . ) are sheltered from the high winds. Thus, downwind/sheltered tables (e.g., 53, 54, 56, . . . ) are subject to less (e.g., minimal) rotational deflection and less (e.g., minimal) dynamic motion in comparison to conventional systems that do not allow the upwind to deflect and thus shield. In conventional tracker systems, these downwind tables would typically be the tables to destabilize due to vortex shedding. The reduced dynamic motion of these downwind tables due to the high rotation of the first table is particularly meaningful.

Figure 9:
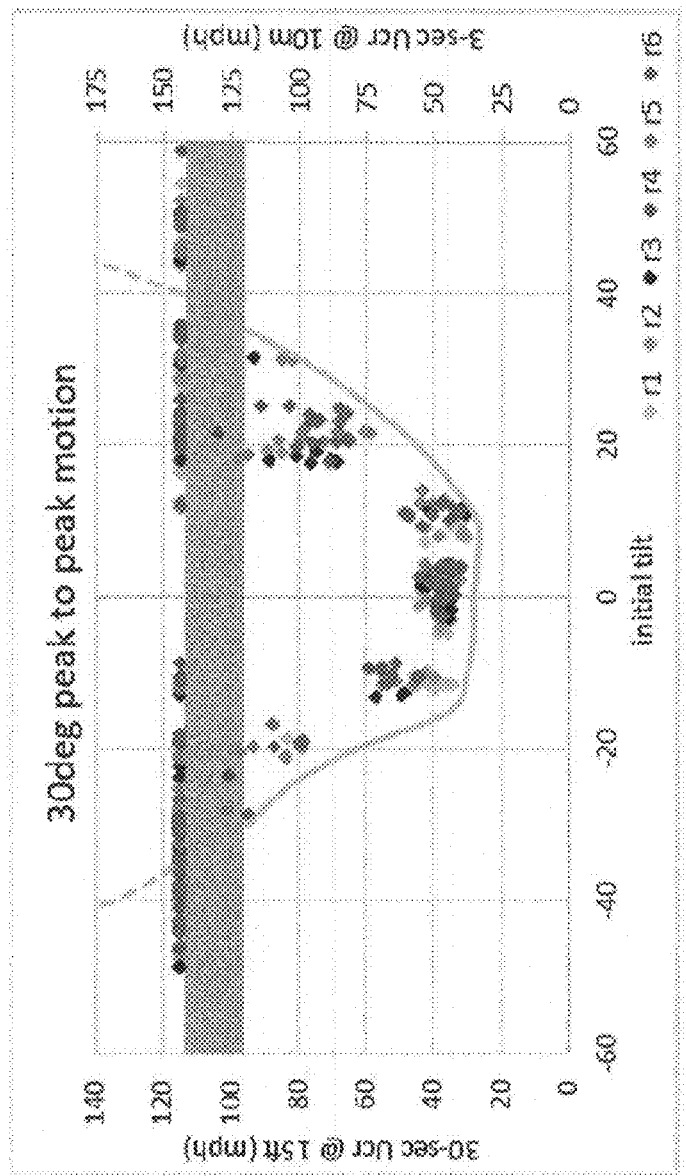
FIG. 9 illustrates the results from an aeroelastic study performed at a 30 degree tilt for photovoltaic module rows.

FIG. 9 illustrates the envelope of acceptable tilt angles vs. wind speed for a self-shielding tracker using the present invention. Were it not for the present invention, the high rotational deflection of the first windward table increases the wind speed at which any table in the array becomes unstable.

Referring again to FIGS. 8 and 9, the sheltering characteristic is shown using boundary layer wind tunnel testing. As wind speeds increase, the first row 50 (see FIG. 7) generally deflects to a significantly higher tilt than the initial tilt (e.g., 30 to 50 degrees higher) at wind speeds of 100 mph [z=15 ft]). As indicated by the Ucr vs. tilt summary plots, higher tilts tend to be more stable, and we believe that having most of the tracker twist out to for example to 50-80 degrees or 60 or 70 degrees, helps the first row 50 (see FIG. 1) remain stable. The stable, high tilt first row 50 essentially creates a wall/shield to shelter downwind trackers, especially rows 2 and 3 (i.e., 52, 54 shown in FIG. 7), and this is evident in the limited deflection in those rows. At high wind speeds, the majority of the span of first row 50 (FIG. 7) deflects out to greater than about a 45° tilt (e.g., 50-80 degrees), essentially creating a wall to protect the downwind trackers.

The photovoltaic modules are characterized such that they are located sufficiently normal to the solar irradiance to have geometric losses of less than 0.05%. As shown in aeroelastic testing in a boundary layer wind tunnel, the high tilt of the edge tracker table (e.g., 50 shown in FIG. 7) prevents that table or any other table in the array from going unstable and exhibiting a vortex lock-in type failure.

In an alternative embodiment the row tube has the ability to deflect up to a tilt of approximately 60 to 80 degrees from horizontal under wind speeds in excess of about 70 mph.

In a further alternative embodiment, the row tube has the ability to deflect up to a tilt of approximately 65 to 75 degrees from horizontal under wind speeds in excess of about 70 mph.

In one embodiment, the row tube may be about 4×4 inches or about 100×100 mm, comprising steel tube (e.g., cold formed) with minimum yield strength of about 50-80 ksi. The row tube may be polygonal, such as for example square.

While various embodiments have been disclosed, it will be apparent to those of ordinary skill in the art that many more embodiments and implementations are possible. For example, as described herein includes several aspects and embodiments each include particular features. Although these features may be described individually, it is within the scope of this disclosure that some or all of these features may be combined with any one of the aspects and remain within the spirit and scope of the invention. Accordingly, the present invention is not to be restricted except in light of the attached claims and their equivalents.

What is claimed is:

1. A solar panel assembly, comprising:
    a plurality of solar panel arrays, each substantially parallel, where the plurality of solar panel arrays comprises a windward array located at an upwind perimeter of the solar panel assembly, where each of the plurality of solar panel arrays comprises a plurality of racking structures comprising
        a stationary structural member securely anchored to a ground surface;
        a rotatable shaft secured to the stationary structural member via a bearing wheel and to which at least first and second solar panels are mounted via a clamp assembly;
        a drive mechanism coupled at a proximate end to the rotatable shaft and coupled at a distal end to an actuator;
    where the rotatable shaft of the windward array comprises a wall thickness and a length that provides a torsional stiffness, which allows the rotatable shaft of the windward array to deflect 60-80 degrees from a horizontal plane that is perpendicular to a length of the stationary structural member, in response to an applied torque from wind speeds in excess of 70 mph, thus positioning the solar panels mounted to the windward array to shield the plurality of solar panel arrays located downwind from the windward array from high wind loads.

2. The solar panel assembly of claim 1, where the rotatable shaft comprises a length of square steel tubing about 4 inches x 4 inches having a minimum yield strength of about 50-80 ksi.

3. The solar panel assembly of claim 2, where wall thickness of the steel tubing of the windward array is about 0.1 inches.

4. The solar panel assembly of claim 1, where the length of the rotatable shaft of the windward array is about 200-350 feet, and comprises a plurality of shaft segments each coupled to an adjacent one of the plurality of shaft segments via a clamping sleeve.

5. A solar panel assembly, comprising:
    a plurality of solar panel arrays, each substantially parallel, where the plurality of solar panel arrays comprises a windward array located at an upwind perimeter of the solar panel assembly, where each of the plurality of solar panel arrays comprises a plurality of racking structures comprising
        a stationary structural member secured to a surface;
        a rotatable shaft secured to the stationary structural member via a bearing and to which at least first and second solar panels are mounted via a clamp;
        a drive mechanism coupled at a proximate end to the rotatable shaft and coupled at a distal end to a drive actuator that causes the rotatable shaft to rotate;
    where the rotatable shaft of the windward array comprises a thickness and a length that provides a torsional stiffness, which allows the rotatable shaft of the windward array to deflect 60-80 degrees from a horizontal plane, that is perpendicular to a length of the stationary structural member, in response to an applied torque from wind speeds on the windward array in excess of 70 mph, thus positioning the solar panels mounted to the windward array to shield the plurality of solar panel arrays located downwind from the windward array from high wind loads.

6. The solar panel assembly of claim 1, where the drive mechanism comprises a drive arm.

7. The solar panel assembly of claim 5, where the drive mechanism comprises a drive arm.

* * * * *